(12) United States Patent
Ollivier et al.

(10) Patent No.: US 8,355,886 B2
(45) Date of Patent: Jan. 15, 2013

(54) METHOD FOR DETERMINING THE CLEARANCE AND/OR MISMATCH OF AN OPENING FOR A VEHICLE WITHOUT REFERENCING THE OPENING

(75) Inventors: Michel Ollivier, Acigne (FR); Arnaud Legeard, Rennes (FR)

(73) Assignee: Edixia, Vern sur Seiche (FR)

( * ) Notice: Subject to any disclaimer, the term of this patent is extended or adjusted under 35 U.S.C. 154(b) by 657 days.

(21) Appl. No.: 12/448,071

(22) PCT Filed: Dec. 7, 2007

(86) PCT No.: PCT/FR2007/052456
§ 371 (c)(1),
(2), (4) Date: Dec. 14, 2009

(87) PCT Pub. No.: WO2008/078029
PCT Pub. Date: Jul. 3, 2008

(65) Prior Publication Data
US 2010/0114525 A1    May 6, 2010

(30) Foreign Application Priority Data
Dec. 7, 2006  (FR) ...................... 06 55367

(51) Int. Cl.
*G01B 7/14*    (2006.01)
(52) U.S. Cl. .......... 702/158; 702/33; 702/155; 702/156; 702/157; 702/159; 702/161; 702/166; 356/614

(58) Field of Classification Search ................ 702/158; 356/614
See application file for complete search history.

(56) References Cited

U.S. PATENT DOCUMENTS

| 5,416,590 | A | | 5/1995 | Stover et al. | |
|---|---|---|---|---|---|
| 5,999,265 | A | * | 12/1999 | Dalancon et al. | 356/614 |
| 6,308,429 | B1 | * | 10/2001 | Green et al. | 33/542 |

FOREIGN PATENT DOCUMENTS

| DE | 199 10 699 | 9/2000 |
|---|---|---|
| JP | 2003-254743 | 9/2003 |

* cited by examiner

*Primary Examiner* — Jonathan C Teixeira Moffat
*Assistant Examiner* — Hyun Park
(74) *Attorney, Agent, or Firm* — Clark & Brody

(57) ABSTRACT

A method to determine the misalignment and/or clearance of a door relative to its frame includes a phase to determine a law of variation of the clearance and/or misalignment values for the different inspection points, in relation to various opening positions of the door taken with respect to a reference position in which the door occupies its closed position, a measurement phase in which the door occupies any position relative to the frame, and during which the clearance and/or misalignment values are measured, and a phase to take into account the measured clearance and/or misalignment values and the law of variation so as to determine the true values of clearance and/or misalignment at the different inspection points corresponding to the door in its reference closed position.

10 Claims, 2 Drawing Sheets

| DP₀ | -1.15 | -0.55 | 0.58 | 1.46 | 2.57 | 3.28 | 4.41 | 5.44 | 6.62 | 7.71 |
| JP₁ | 11.12 | 11.20 | 11.43 | 11.65 | 11.93 | 12.13 | 12.39 | 12.61 | 12.87 | 13.13 |
| DP₁ | -3.63 | -3.17 | -2.33 | -1.65 | -0.75 | -0.21 | 0.67 | 1.47 | 2.36 | 3.20 |

METHOD FOR DETERMINING THE CLEARANCE AND/OR MISMATCH OF AN OPENING FOR A VEHICLE WITHOUT REFERENCING THE OPENING

FIELD OF THE INVENTION

The present invention concerns the technical area relating to the inspection of door positioning, doors being taken in their general meaning, with respect to their surround or frame.

More particularly, the present invention concerns the measurement of the clearance between the edge of a door and its frame, and also concerns the offset of the plane of extension between the door and frame also called misalignment.

The present invention finds particularly advantageous, but non-exclusive, application to the inspection of motor vehicle doors, such as the side doors or boot.

BACKGROUND ART

In the area of the quality control of vehicle bodywork, there is the need, before the painting operation for example, to verify that the doors are correctly positioned relative to their frame. The purpose of this inspection is to determine whether the value of the clearance vis-à-vis the frame around the entire periphery of the door lies within a range of tolerance. Also said inspection must determine whether or not the door lies flush with the frame. Any misalignment of the door must also be inspected at various peripheral points of the door.

The difficulty with this operation to inspect the clearance and/or misalignment of a door lies in the fact that this inspection is carried out when the latching system of the door is still not mounted. Yet, measurement of clearance and/or misalignment can only be meaningful if the door occupies its reference closed position as determined by the engaging of the strike plate of the latch system into its housing.

To ensure the inspection of vehicle doors on a production line, it is known from document JP 2003 25 47 43 for example to place magnets at strike plate level at the entry to the inspection station so as to position the door in its reference closed position. In this position of the door, measurements of clearance and/or misalignment are made using a system of measurement sensors performing measurements at different inspection points distributed around the periphery of the door, so as to determine whether or not the door occupies a correct position relative to the frame. On leaving the inspection station, the magnets are removed from the vehicles.

So as to automate the positioning of doors in their reference closed position, it is known to equip the inspection station with a mechanical system for reference positioning of the doors. The mechanical system comprises an automated arm which carries a beam provided with suction pads, the beam intended to come into contact with the door and the frame so that the door takes up its closed reference position. The forced positioning of the door with said mechanical system gives good results in terms of reliability. However, this mechanical system has the disadvantage of requiring a particular embodiment for each vehicle profile. Additionally, the design and maintenance costs of said mechanical device are very substantial.

SUMMARY OF THE INVENTION

The present invention therefore sets out to overcome the disadvantages of the prior art by proposing a novel technique to determine automatically the clearance and/or misalignment of doors, this technique being independent of the shape of the door.

Another purpose of the invention is to propose a novel technique adapted to determine the clearance and/or misalignment of a door without any contact with the door.

To achieve this objective, the invention concerns a method to determine the misalignment and/or clearance of a door relative to its frame, using a system of measurement sensors adapted to perform measurements of clearances and/or misalignments at different inspection points of the door, the method comprising:

a phase to determine a law of variation of the clearance and/or misalignment values at the different inspection points, in relation to various opening positions of the door taken with respect to a reference position in which the door occupies its reference closed position, corresponding to a reference inspection point of the door, a measurement phase in which the door occupies any position relative to its frame and during which values of clearance and/or misalignment are measured at different inspection points of the door, and a phase to take into account the measured clearance and/or misalignment values and the law of variation so as to determine the true values of clearance and/or misalignment at the different inspection points corresponding to the door in its reference closed position.

According to one preferred variant of embodiment, the phase to determine a law of variation consists of a learning phase on a door, during which the clearance and/or misalignment values are measured at the different inspection points in relation to various opening positions of the door.

According to another variant of embodiment, the phase to determine a law of variation consists of a modeling phase of a door positioned in various opening positions and for which the clearance and/or misalignment values are calculated at the different inspection points.

According to the preferred variant of embodiment, the method consists, for the learning phase, of using the method of least squares to determine a law of variation for the inspection points:

for clearance J such that: $J_{Pi}=K+f(D_{P0})$ in which K is a constant determined during the learning phase and $f(D_{P0})$ is a mathematical function dependent upon misalignment value $D_{P0}$ at the reference inspection point for misalignment D such that: $D_{Pi}=K_1+f_1(D_{P0})$ in which $K_1$ is a constant determined during the learning phase and $f_1(D_{P0})$ is a mathematical function dependent upon misalignment value $D_{P0}$ at the reference inspection point.

Advantageously, the method consists of determining the laws of variation for clearance and misalignment using linear mathematical functions f and $f_1$.

Preferably, for the entry into account phase, the method consists of correcting the measured clearance and/or misalignment values at each inspection point, using the law of variation so as to determine the true clearance and/or misalignments values for each inspection point.

According to one embodiment, for the inspection points $P_i$, the method consists of determining the following for the door under consideration in its reference closed position:

the true clearance values such that: $J_{RPi}=J_{mPi}+J_{cPi}$ in which $J_{mPi}$ is the clearance measured at inspection point $P_i$ during the measurement phase, and $J_{cPi}$ is the correction value of clearance calculated using the previously determined law of variation $(K+f(D_{P0}))$ and for the misalignment value $D_{P0}$ measured at the reference inspection point $(P_0)$, the true misalignment values so that: $D_{RPi}=D_{mPi}+D_{cPi}$ in which $D_{mPi}$ is misalignment measured at inspection point $P_i$ during the measurement phase, and $D_{cPi}$ is the correction value of misalignment calculated using the previously determined law of variation $(K_1+f_1(D_{P0}))$ and for the misalignment value $D_{P0}$ measured at the reference inspection point $(P_0)$.

According to one variant of embodiment, the method consists of conducting substantially simultaneous measurement of the clearance and/or misalignment values at the different inspection points of the door.

The method of the invention consists of determining the clearance and/or misalignment of a door pivoting about hinges.

According to one example of application, the method consists of determining the clearance and/or misalignment of a door pivoting about hinges.

According to another example of application, to determine the clearance and/or misalignment of a pivoting door adjacent a non-mounted door, the method consists of:

choosing at least one first, one second and one third inspection points respectively located at the hinges of the pivoting door, on the pivoting door opposite the hinges, and on the frame of the non-mounted door lying opposite the pivoting door, defining the equation of the straight line passing through the first and third inspection points, calculating the distance of the second inspection point from the calculated straight line, subtracting from this distance a learning value obtained during positioning of the pivoting door in its reference closed position, so as to obtain the correction value of misalignment, and of determining the true values of clearance and/or misalignment at the different inspection points corresponding to the door in its reference closed position, by correcting the measured values of clearance and/or misalignment at each inspection point using the correction misalignment value.

According to one preferred variant of embodiment, the method consists of performing the measurements using a system with projected light beam sensors, which analyzes these light beams.

A further purpose of the invention is to propose an installation to determine the misalignment and/or clearance of a door relative to its frame, which comprises a measurement sensor system linked to a control and processing unit enabling implementation of the method of the invention.

Various other characteristics will become apparent from the description given below with reference to the appended drawings which, as non-limiting examples, show embodiments of the subject of the invention.

DESCRIPTION OF THE INVENTION

The subject of the invention concerns a novel method to determine the clearance J and/or misalignment D of a door 1 relative to its frame or surround 2 in the general meaning.

Figure 1:
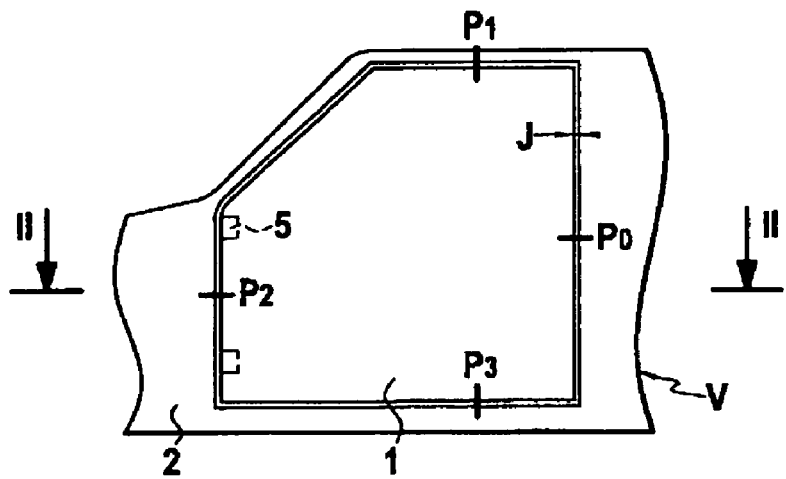
FIG. 1 is an elevation view showing a door of a vehicle, whose clearance and misalignment are to be inspected.
Figure 2:
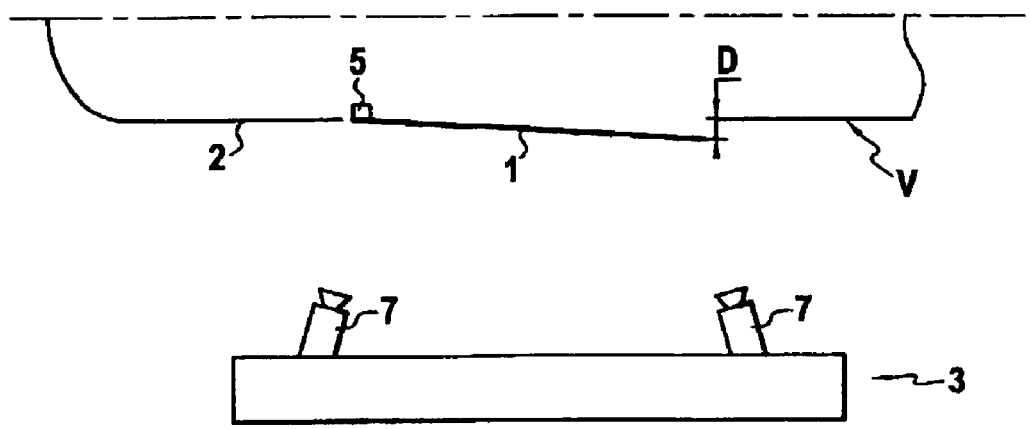
FIG. 2 is an overhead sectional view, substantially along lines II-II of FIG. 1.

In the description below with reference to FIGS. 1 and 2, the method is applied to a pivoting door 1 such as a side door of a motor vehicle V, but evidently the subject of the invention can be applied to any type of door. In the illustrated example, the method of the invention is applied to an inspection station 3 installed on a motor vehicle production line. At this stage of manufacture, the pivoting doors 1 are mounted on the bodywork V via two hinges 5 defining the axis of rotation or pivoting of the door. In this state, the door 1 is not equipped with the latching system such as a strike plate which enables the door to be placed in its reference closed position. Therefore when passing in front of the inspection station 3, the doors 1 occupy an undetermined closed position which is more or less close to the reference closed position imposed by the locking system of the door.

The inspection station 3 is equipped with a measurement sensor system 7 adapted to measure the values of clearance J and/or misalignment D of the door at different inspection points $P_i$ (where i=o to n). Preferably, the measurement sensors used comprise a light beam emitter such as a laser beam, and a beam receiver such as a video camera linked to a control and processing unit enabling determination of the clearance and misalignment values of the door. Evidently the measurement sensor system can be of a different type, e.g. of ultrasound type. The means for processing measurements to obtain the clearance and misalignment values are not further described since they are known to the person skilled in the art and are not part of the subject of the invention.

The method of the invention sets out, at different inspection points $P_i$ of a door, to achieve contactless determination of the true values of clearance and/or misalignment of the door 1 corresponding to its reference closed position, even though this door is not forced to take up this reference closed position. In other words, the measurements of the true values of clearance and/or misalignment are carried out without having recourse to a mechanical system to position the door in its reference closed position.

For memory, it is recalled that clearance J corresponds to the distance separating the edge of the door 1 from the frame 2 along one plane, whilst misalignment D corresponds to the offset in level between the door 1 and the frame 2.

The principle of the invention targets measuring the clearance and misalignment in the position occupied by the door when the vehicle arrives at the inspection station 3. Evidently, the measurements taken are flawed by an error since the measurements are taken when the door is not in its reference closed position. This reference closed position is given when the strike plate of the door's latch system is engaged in the latch housing.

The principle of the invention is therefore to correct the measurements taken by using a reference measurement of misalignment at a reference point $P_0$ of the door for which theoretical alignment is known. In the following description, the reference inspection point $P_0$ corresponds to the closing point of the door i.e. the point at which the strike plate of the latch system is mounted. Evidently, it can be contemplated to use as reference inspection point $P_0$ another inspection point for which door alignment is known when the door occupies its reference closed position.

This correction is based on the fact that the axis of rotation of the door is known since it passes through the axis of the two hinges 5. Under these conditions, each point of the door 1 moves in a plane perpendicular to the axis of rotation and over a distance proportional to the distance of the inspection point from the rotation axis (valid for small angles). Therefore, on the basis of measurement of clearance and misalignment at a reference point, e.g. closed reference point, and with knowledge of the direction of the sensors and their distance from the axis of rotation of the door, the clearance and misalignment measurements taken at the different inspection points $P_i$ can be corrected. In other words, the method of the invention, for each inspection point, consists of determining for the door under consideration in its reference closed position:

the true values of clearance such that $J_{rpi}=J_{mpi}+J_{cpi}$ in which $J_{mpi}$ is the clearance measured at inspection point $P_i$ during the measurement phase, and $J_{cpi}$ is the correction clearance value, the true values of misalignment such that $D_{rpi}=D_{mpi}+D_{cpi}$ in which $D_{mpi}$ is the misalignment measured at inspection point $P_i$ during the measurement phase and $D_{cpi}$ is the correction misalignment value.

It therefore appears necessary, prior to the measurement phase, to determine the type of correction to be made to the measurements taken.

The method of the invention therefore comprises an initial phase to determine a law of variation of the clearance and/or misalignment values for the different inspection points $P_i$ in relation to the various opening positions of the door relative to the reference position in which the door occupies its reference closed position. It is to be noted that one of the inspection points $P_i$ corresponds to the reference inspection point $P_0$ of the door, i.e. in the example under consideration to the position in which the latch strike plate will be mounted.

According to a first variant of embodiment, the phase to determine a law of variation consists of a phase to model a door 1 positioned in various opening positions and for which the clearance and/or misalignment values are calculated at the different inspection points. This variant uses a computer-assisted design system to calculate the correction to be made to the measurements taken. This variant requires positioning of the sensors exactly at the points reproduced on the model.

According to a second variant of embodiment, the phase to determine a law of variation consists of a learning phase on a door, during which clearance and/or misalignment values are measured at the different inspection points $P_i$ in relation to various opening positions of the door. This learning phase, for the inspection points $P_i$ and using a method of least squares, consists of determining a law of variation:

for clearance such that: $J_{Pi}=K+f(D_{P0})$ where K is a constant determined during the learning phase and $f(D_{P0})$ is a mathematical function dependent upon misalignment value $D_{P0}$ at the reference inspection point $P_0$ corresponding to the closed point, for misalignment such that: $D_{Pi}=K_1+f_i(D_{P0})$ where $K_1$ is a constant determined during the learning phase and $f_1(D_{P0})$ is a mathematical function dependent upon misalignment value $D_{P0}$ at the reference inspection point $P_0$ corresponding to the closed point.

This learning phase therefore sets out to determine the constants K, $K_1$ and the mathematical functions f and $f_1$.

The learning phase is conducted on one of the vehicles intended to be inspected. On said vehicle, the clearance and/or misalignment values are measured at different inspection points $P_i$ in relation to the various opening positions of the door. As can be seen FIG. 3, for different opening positions of the door corresponding to misalignment $D_{P0}$ at reference point $P_0$, the clearance and misalignment values are measured at various inspection points $P_i$ for clearance $J_{Pi}$ and misalignment $D_{Pi}$. In the example illustrated FIG. 3, only the values measured at inspection point $P_1$ for clearance $J_{P1}$ and misalignment $D_{P1}$ are shown. Evidently, the clearance and misalignment values can be measured at several inspection points $P_i$.

It is to be noted that during this learning phase, the reference misalignment $D_{P0}$ has been caused to vary over sufficient amplitude to obtain a correct law of variation. In the illustrated example, the total amplitude of reference misalignment $D_{P0}$ is of the order of 9 mm, which corresponds to a higher amplitude value than encountered during measuring operations.

On the basis of these measurements, the law of variation $J_{pi}$ is defined for clearance and the law of variation $D_{pi}$ for misalignment. The method therefore sets out to calculate the dependency of the different measurement points $P_1$, $P_2$, ... with respect to alignment at the reference inspection point $P_0$. In the illustrated example, the laws of variation of alignment $D_{P1}$ and clearance $J_{P1}$ at inspection point $P_1$ using a least squares method are the following:

$$D_{p1}=0.7679\times(D_{p0})-2.427$$

$$J_{p1}=0.2332\times(D_{p0})+11.335$$

The values 11.335 and −2.427 are clearance and alignment respectively at inspection point $P_1$ for the door of the learning vehicle.

In the example under consideration, it is to be noted that the mathematical functions f and $f_1$ are linear. Evidently, the mathematical functions could be different from a linear law of variation with constants.

On completion of this phase to determine a law of variation, it can be envisaged to proceed with inspecting the doors of the vehicles.

Therefore, when a vehicle arrives at an inspection station, a measurement phase is carried out during which the door 1, with respect to the frame, occupies any position or a position not precisely defined. During this phase, the values of clearance and/or misalignment are measured at the different inspection points $P_i$ of the door. It is to be noted that during this phase, the measurements are necessarily taken at the reference inspection point $P_0$.

Preferably, the measurements of clearance and/or misalignment at the different inspection points $P_i$ of the door are performed substantially simultaneously.

After completing this measurement phase, the following phase consists of taking into account firstly the measured values of clearance and/or misalignment and secondly the law of variation determined during the initial phase so as to determine the true values of clearance and/or misalignment at the different inspection points $P_i$ corresponding to the door in its reference closed position. In other words, this entry into account phase aims at correcting the measured values of clearance and/or misalignment at each inspection point using the law of variation so as to determine, for each inspection point, the true values of clearance and/or misalignment. Therefore the method, for inspection points $P_i$, consists of determining for the door under consideration and in its reference closed position:

the true values of clearance such that $J_{rpi}=J_{mpi}+J_{cpi}$ where $J_{mpi}$ is the clearance measured at inspection point $P_i$ during the measurement phase, and $J_{cpi}$ is the corrected clearance value calculated using the previously determined law of variation ($K+f(D_{p0})$) and for the misalignment value $D_{p0}$ measured at the reference inspection point $P_0$, the true values of misalignment such that $D_{rpi}=D_{mpi}+D_{cpi}$ where $D_{mpi}$ is the misalignment measured at inspection point $P_i$ during the measurement phase, and $D_{cpi}$ is the corrected misalignment value calculated using the previously determined law of variation ($K_1+f_1 D_{p0}$) and for the misalignment value $D_{p0}$ measured at reference inspection point $P_0$.

With the method of the invention, it is therefore possible to take measurements on a door not lying in the reference closed position, by correcting its position with respect to the value of the reference misalignment position.

In the above description, the method has been described for a door pivoting about hinges, extending relative to its frame.

Figures 3, 4:
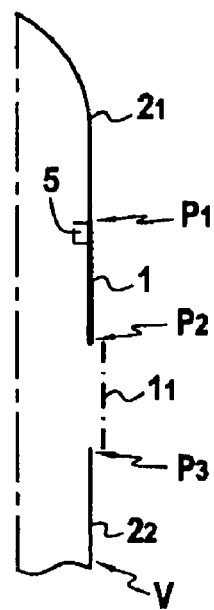
FIG. 3 is a table which, for different opening values of the door, gives measured values of clearance and misalignment at an inspection point $P_1$.
FIG. 4 is a schematic view of a door adjacent a non-mounted door.

It is to be noted that the subject of the invention allows determination of the clearance and/or misalignment of a pivoting door 1 adjacent a non-mounted door 1$_1$ such as a sliding door as illustrated FIG. 4. According to this example, part of the frame 2 of the door 1 consists of an adjacent fixed panel 2$_1$ and a panel 2$_2$ distant from the edge of the door 1, so as to allow an opening to subsist intended to receive a sliding side door 1$_1$. According to this variant of embodiment, the method consists of choosing at least one first $P_1$, one second $P_2$ and one third $P_3$ inspection points respectively located at the hinges 5 of the pivoting door 1, on the pivoting door 1 at a point opposite the hinges, and on the frame 2$_2$ of the non-mounted door 1$_1$ located opposite the pivoting door 1.

The method then consists of defining the equation of the straight line passing through the first $P_1$ and third $P_3$ inspection points, and of calculating the distance of the second inspection point $P_2$ from the calculated straight line. From this distance, a learning value is subtracted, obtained during positioning of the pivoting door 1 in its reference inspection position $P_0$ so as to obtain the misalignment correction value.

The method consists of determining the true values of clearance and/or misalignment at the different inspection points corresponding to the door in its reference closed position, by correcting the measured clearance and/or misalignment values at each inspection point using the misalignment correction value. The method is not described more precisely for this variant insofar as the method reproduces the differences that were specifically described with reference to FIGS. 1 to 3.

The invention is not limited to the described, illustrated examples since various modifications can be made thereto without departing from the scope of the invention.

The invention claimed is:

1. Method to determine the misalignment and/or clearance of a door relative to its frame, using a system of measurement sensors adapted to perform measurements of clearance and/or misalignment at different inspection points (Pi) of the door, characterized in that it comprises:
a phase to determine a law of variation of the clearance and/or misalignment values for the different inspection points ($P_i$) in relation to various opening positions of the door with respect to a reference position in which the door occupies its reference closed position, corresponding to a reference inspection point ($P_0$) of the door, the phase to determine a law of variation consisting of a learning phase on a door, during which clearance and/or misalignment values are measured at the different inspection points in relation to various opening positions of the door, the learning phase determining for the inspection points (Pi) a law of variation:

for clearance such that: $J_{Pi}=K+f(D_{P0})$ in which K is a constant determined during the learning phase and $f(D_{P0})$ is a mathematical function dependent upon the misalignment value $D_{P0}$ at the reference inspection point ($P_0$), for misalignment such that: $D_{Pi}=K_1+f_1(D_{P0})$ in which $K_1$ is a constant determined during the learning phase and $f_1(D_{P0})$ is a mathematical function dependent upon the misalignment value $D_{P0}$ at the reference inspection point ($P_0$)

a measurement phase in which the door (1) occupies any position relative to the frame and in which clearance and/or misalignment values are measured at the different inspection points of the door, and a phase to take into account the measured clearance and/or misalignment values and the law of variation so as to determine the true values of clearance and/or misalignment at the different inspection points corresponding to the door in its reference closed position.

2. Method according to claim 1, characterized in that it consists of determining the laws of variation for clearance and misalignment using linear mathematical functions f and $f_1$.

3. Method according to claim 1 characterized in that it consists of determining the laws of variation for clearance and misalignment using linear mathematical functions f and $f_1$, and for the entry into account phase, it consists of correcting the measured clearance and/or misalignment values at each inspection point, using the law of variation, so as to determine the true values of clearance and/or misalignment at each inspection point.

4. Method according to claim 3 characterized in that, for the inspection points $P_i$, it consists of determining for the door under consideration in its reference closed position:

the true clearance values such that: $J_{RPi}=J_{mPi+JcPi}$ in which $J_{mPi}$ is the clearance measured at inspection point $P_i$ during the measurement phase, and $J_{cPi}$ is the correction clearance value calculated using the previously determined law of variation ($K+f(D_{P0})$) and for the misalignment value $D_{P0}$ measured at the reference inspection point ($P_0$), the true misalignment values such that: $D_{RPi}=D_{mPi}+D_{cPi}$ in which $D_{mPi}$ is the misalignment measured at inspection point $P_i$ during the measurement phase, and $D_{cPi}$ is the correction misalignment value calculated using the previously determined law of variation ($K_1+f_1(D_{P0})$) and for the misalignment value $D_{P0}$ measured at the reference inspection point ($P_0$).

5. Method according to claim 1, characterized in that it consists of taking substantially simultaneous measurement of the clearance and/or misalignment values at the different inspection points of the door.

6. Method according to claim 1, characterized in that it consists of conducting the learning phase on at least one door of a vehicle taken from a vehicle production line.

7. Method according to claim 1, characterized in that it consists of determining the clearance and/or misalignment of a door pivoting about hinges.

8. Method according to claim 1, characterized in that, to determine the clearance and/or misalignment of a pivoting door adjacent a non-mounted door, it consists of:

choosing at least one first ($P_1$), one second ($P_2$) and one third ($P_3$) inspection points respectively located at the hinges of the pivoting door, on the pivoting door opposite the hinges, and on the frame of the non-mounted door lying opposite the pivoting door, defining the equation of the straight line passing through the first and third inspection points, calculating the distance of the second inspection point from the calculated straight line, subtracting from this distance a learning value obtained during positioning of the pivoting door in its reference closed position, so as to obtain the correction value of misalignment, and of determining the true values of clearance and/or misalignment at the different inspection points corresponding to the door in its reference closed position, by correcting the measured clearance and/or misalignment values at each inspection point using the correction value for misalignment.

9. Method according to claim 1, characterized in that it consists of taking the measurements using a system with projected light beam sensors which analyzes these light beams.

10. Installation to determine the misalignment and/or clearance of a door with respect to its frame, characterized in that it comprises a measurement sensor system linked to a control and processing unit enabling the implementation of the method conforming to claim 1.

* * * * *

UNITED STATES PATENT AND TRADEMARK OFFICE
CERTIFICATE OF CORRECTION

PATENT NO. : 8,355,886 B2
APPLICATION NO. : 12/448071
DATED : January 15, 2013
INVENTOR(S) : Ollivier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this
First Day of September, 2015

Michelle K. Lee
*Director of the United States Patent and Trademark Office*